（12）United States Patent
Park et al.

(10) Patent No.: US 11,262,962 B2
(45) Date of Patent: Mar. 1, 2022

(54) HOME APPLIANCE AND CONTROL METHOD THEREOF

(71) Applicant: Samsung Electronics Co., Ltd., Suwon-si (KR)

(72) Inventors: Yongjae Park, Suwon-si (KR); Kyuho Jo, Suwon-si (KR); Soyoung Yun, Suwon-si (KR); Munkeun Lee, Suwon-si (KR); Joohwan Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/717,127

(22) Filed: Dec. 17, 2019

(65) Prior Publication Data

US 2020/0218482 A1 Jul. 9, 2020

(30) Foreign Application Priority Data

Jan. 4, 2019 (KR) ........................ 10-2019-0001398

(51) Int. Cl.
G06F 3/14 (2006.01)
(52) U.S. Cl.
CPC ............ G06F 3/14 (2013.01); *F25D 2400/36* (2013.01)
(58) Field of Classification Search
CPC .................................................. G06T 13/205
See application file for complete search history.

(56) References Cited

U.S. PATENT DOCUMENTS

| 6,204,763 | B1* | 3/2001 | Sone | .................... | A47G 29/141 |
| | | | | | 221/2 |
| 9,144,328 | B2 | 9/2015 | Seeley | | |
| 9,353,990 | B2 | 5/2016 | Kim et al. | | |
| 9,432,322 | B2 | 8/2016 | Tetsuhashi | | |
| 10,055,117 | B2 | 8/2018 | Kim et al. | | |
| 10,436,498 | B2 | 10/2019 | Lim et al. | | |
| 2004/0047344 | A1* | 3/2004 | Chan | ...................... | G06F 3/023 |
| | | | | | 370/352 |
| 2005/0034057 | A1* | 2/2005 | Hull | ...................... | G06F 40/106 |
| | | | | | 715/202 |
| 2006/0135220 | A1 | 6/2006 | Kim et al. | | |
| 2008/0086533 | A1* | 4/2008 | Neuhauser | ............. | A61B 5/489 |
| | | | | | 709/206 |

(Continued)

FOREIGN PATENT DOCUMENTS

EP 3158425 A1 4/2017
EP 3 287 723 A1 2/2018

(Continued)

OTHER PUBLICATIONS

International Search Report and Written Opinion dated Apr. 17, 2020; Issued in International Application No. PCT/KR2019/018385.

(Continued)

*Primary Examiner* — Phi Hoang
(74) *Attorney, Agent, or Firm* — Jefferson IP Law, LLP

(57) ABSTRACT

A home appliance and a control method therefor are provided. The home appliance includes a display, a sensor to detect whether a door is opened or closed, and at least one processor configured to control the display to display one or more objects, and based on sensing, by the sensor, at least one of an opening or a closing of the door, provide visual feedback to the one or more objects.

18 Claims, 11 Drawing Sheets

(56) References Cited

U.S. PATENT DOCUMENTS

| | | | |
|---|---|---|---|
| 2010/0170289 A1* | 7/2010 | Graziano | F25D 23/02 |
| | | | 62/449 |
| 2011/0029870 A1 | 2/2011 | May et al. | |
| 2012/0105424 A1 | 5/2012 | Lee et al. | |
| 2013/0067375 A1 | 3/2013 | Kim et al. | |
| 2013/0069957 A1* | 3/2013 | Xie | G06T 13/205 |
| | | | 345/473 |
| 2014/0169640 A1 | 6/2014 | Park et al. | |
| 2016/0239179 A1 | 8/2016 | Kim et al. | |
| 2017/0061521 A1* | 3/2017 | Lee | G06F 3/04842 |
| 2017/0268924 A1 | 9/2017 | Shin et al. | |
| 2018/0150709 A1 | 5/2018 | Ha | |
| 2018/0187969 A1 | 7/2018 | Kim et al. | |
| 2018/0240438 A1 | 8/2018 | Lee et al. | |
| 2018/0266751 A1 | 9/2018 | Lim et al. | |
| 2019/0271498 A1 | 9/2019 | Lim et al. | |
| 2019/0368805 A1 | 12/2019 | Lim et al. | |
| 2020/0051372 A1* | 2/2020 | Chapman | A63F 5/045 |
| 2020/0074705 A1* | 3/2020 | Berger | G06T 13/80 |
| 2020/0193706 A1* | 6/2020 | Yeh | G06T 19/20 |

FOREIGN PATENT DOCUMENTS

| | | |
|---|---|---|
| JP | 2014-199667 A | 10/2014 |
| KR | 10-2007-0038320 A | 4/2007 |
| KR | 10-0809585 B1 | 3/2008 |
| KR | 10-2011-0096775 A | 8/2011 |
| KR | 10-2015-0025365 A | 3/2015 |
| KR | 10-2017-0028238 A | 3/2017 |
| KR | 10-1821196 B1 | 1/2018 |
| KR | 10-2018-0061835 A | 6/2018 |
| WO | 2016/022203 A1 | 2/2016 |
| WO | 2018/143550 A1 | 8/2018 |

OTHER PUBLICATIONS

Extended European Search Report dated May 25, 2020, issued in European Application No. 19219262.3.

European Search Report dated Jan. 3, 2022; European Appln. No. 19 219 262.3-1009.

* cited by examiner

HOME APPLIANCE AND CONTROL METHOD THEREOF

CROSS-REFERENCE TO RELATED APPLICATION(S)

This application is based on and claims priority under 35 U.S.C. § 119 of a Korean patent application number 10-2019-0001398, filed on Jan. 4, 2019, in the Korean Intellectual Property Office, the disclosure of which is incorporated by reference herein in its entirety.

BACKGROUND

1. Field

The disclosure relates to a home appliance and a control method thereof. More particularly, the disclosure relates to a home appliance provided with a display and a control method thereof.

2. Description of Related Art

With the development of electronic technology, various types of electronic devices are being developed and supplied.

Specifically, the recent various home appliances being supplied to the homes are combined with internet of things technology and are capable of transmitting and receiving data interchangeably, and use through the transmitting and receiving data is becoming more varied.

In the case of a refrigerator, it can also be utilized as a hub providing information to family members in addition to its existing role as a food storage. For example, the refrigerator is provided with a display and may provide news, recipes, schedules, and the like to family members.

Rather than home appliances simply displaying an image, memo, sketch, and the like, there is a need for technology that applies graphic effect to objects such as images, memos, and the like to provide users with visual feedback as if the relevant objects are real.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a home appliance that senses an opening or closing of a door and provides a visual feedback based therefrom and a control method thereof.

Additional aspects will be set forth in part in the description which follows and, in part, will be apparent from the description, or may be learned by practice of the presented embodiments.

In accordance with an aspect of the disclosure, a home appliance is provided. The home appliance includes a display, a sensor to detect whether a door is opened or closed, and at least one processor configured to control the display to display one or more objects on the display, and based on sensing, by the sensor, at least one from an opening or a closing of the door, provide visual feedback to the one or more objects.

The at least one processor may decide whether to provide visual feedback based on a type of the one or more objects.

In addition, the at least one processor may provide a first visual feedback of a first form based on the one or more objects being a first type, and provide a second visual feedback of a second form based on the one or more objects being a second type. The first visual feedback and the second visual feedback differ in at least one of a type of feedback effect, a strength of feedback effect or a reference axis of feedback effect.

In addition, the visual feedback is a swaying effect, and the at least one processor may control the display to provide a pin object that provides a content object including at least one of an image or a memo and a function that fixes the content object to a specific position of the display area of the display, and provide the swaying effect to the content object with the position of the pin object as a reference axis.

In addition, the visual feedback may include at least one of a left and right swaying effect, a back and forth swaying effect, or a shaking effect.

The at least one processor may decide a swaying strength according to the swaying effect or the shaking strength according to the shaking effect based on an intensity of the opening or closing of the door detected by the sensor.

In addition, the home appliance may further include a microphone, and the at least one processor may identify the intensity of the door opening or closing based on a sound detected by the microphone, and determine a swaying strength according to the swaying effect or a shaking strength according to the shaking effect based on the intensity of the door opening or closing.

In addition, the at least one processor may, based on the one or more objects being an object that includes information related to a schedule, provide a different visual feedback based on a difference between a target date identified by the information related to schedule and a current time information.

The at least one processor may, based on the current time being identified as having elapsed the target date, provide a visual feedback that drops the object to a lower area of the display area of the display.

In addition, the home appliance may further include a sensor to detect a user, and the at least one processor may, based on detecting a movement of a user at the front surface of the display by the sensor, provide a visual feedback corresponding to the movement of the user.

In addition, the at least one processor may control the display to provide a board screen, control the display to display the at least one or more objects on the board screen, and based on sensing at least one of the door opening or closing, provide the visual feedback to the one or more objects.

In accordance with another aspect of the disclosure, a control method of a home appliance is provided. The control method includes displaying one or more objects on a display provided in the home appliance, and based on sensing, by a sensor provided in the home appliance, at least one of an opening or a closing of a door of the home appliance, providing a visual feedback to the one or more objects.

The providing of the visual feedback may include deciding whether to provide the visual feedback based on a type of the one or more objects.

In addition, the providing the visual feedback may include, based on the one or more objects being a first type, providing a first visual feedback of a first form, and based on the one or more objects being a second type, providing a second visual feedback of a second form, and the first visual feedback and the second visual feedback may differ in at least one of a type of feedback effect, a strength of feedback effect or a reference axis of feedback effect.

In addition, the visual feedback may include a swaying effect, and the providing of the visual feedback may include providing a pin object that provides a content object including at least one of an image or a memo and a function fixing the content object to a specific position of a display area of the display, and providing the swaying effect to the content object with the position of the pin object as a reference axis.

In addition, the visual feedback may include at least one of a left and right swaying effect, a back and forth swaying effect, or a shaking effect.

In addition, the providing of the visual feedback may include deciding a swaying strength according to the swaying effect or a shaking strength according to the shaking effect based on an intensity of the opening or closing of the door detected by the sensor.

The providing of the visual feedback may include identifying an intensity of the door opening or closing based on a sound detected by a microphone provided in the home appliance and determining a swaying strength according to the swaying effect or a shaking strength according to the shaking effect based on the intensity of the door opening or closing.

In addition, the providing of the visual feedback may include, based on the one or more objects being an object that includes information related to a schedule, providing a different visual feedback based on a difference between a target date identified by the information related to schedule and current time information.

The providing of the visual feedback may include, based on identifying that current time has elapsed the target date, providing a visual feedback that drops the object to a lower area of the display area of the display In addition, the providing of the visual feedback may include, based on detecting a movement of a user at the front surface of the display by a sensor provided in the home appliance, providing a visual feedback corresponding to the movement of the user.

According to the various embodiments of the disclosure as described above, a visual feedback is provided to the object provided through the display, and thus a user may receive a sense as if the object is real.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description, taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression at least one from A and/or B is to be understood as indicating at least one of "A" or "B" or "A and B".

Expressions such as "first" or "second" used in the disclosure may be used to identify various elements regardless of order and/or importance, and may be used merely to differentiate one element from another but the relevant elements should not be limited thereto.

Based on an element (example: first element) being indicated as being "(operatively or communicatively) coupled with/to" or "connected to" another element (example: second element), it is to be understood that a certain element may be directly coupled to another element or may be coupled through another element (example: third element).

A singular expression includes a plural expression, unless otherwise specified.

In the disclosure, terms such as "module" or "part" may be used to perform at least one function or operation, and may be implemented as hardware or software, or a combination of hardware and software. Further, a plurality of "modules" or a plurality of "parts" except for when the "modules" or "parts" need to be implemented to a specific hardware, may be integrated to at least one module to be implemented as at least one processor (not shown)

In the disclosure, the term user may designate a user using an electronic apparatus or an apparatus using an electronic apparatus (example: electronic device with artificial intelligence).

Example embodiments of the disclosure will be described in greater detail below with reference to the attached drawings.

Figure 1:
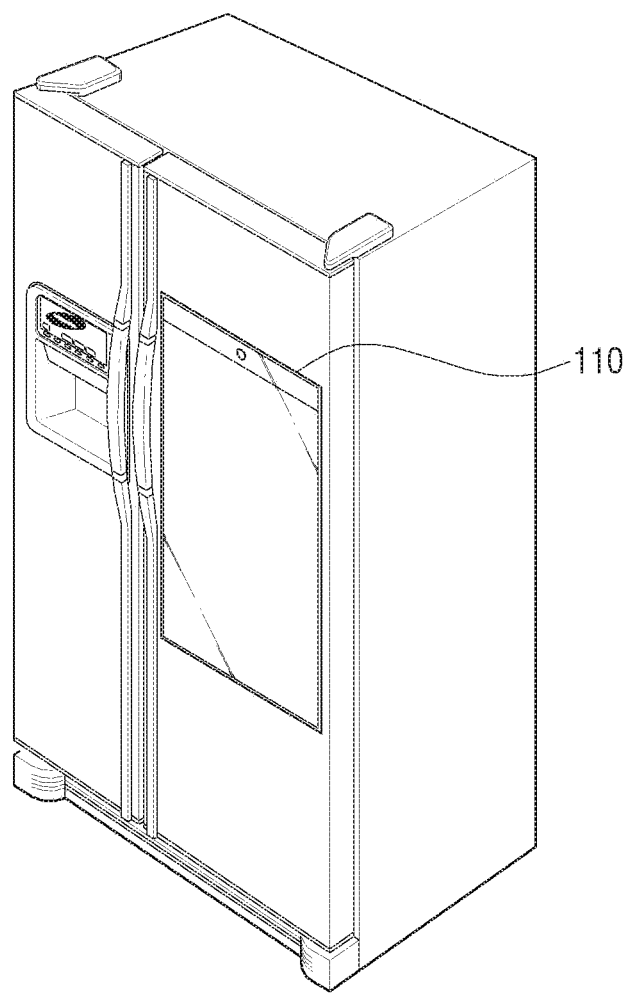
FIG. 1 is a diagram illustrating an example exterior of an example home appliance according to an embodiment of the t disclosure.

FIG. 1 is a diagram illustrating an example exterior of an example home appliance according to an embodiment of the disclosure.

A home appliance 100 according to various example embodiments of the disclosure may include at least one from, for example, smartphones, tablet PCs, mobile phones, video telephones, electronic book readers, desktop PCs, laptop PCs, netbook computers, workstations, servers, a personal digital assistant (PDA), a portable multimedia player (PMP), an MP3 player, a medical device, a camera, or a wearable device. The wearable device may include at least one of an accessory type (example: a watch, a ring, a bracelet, an anklet, a necklace, a pair of glasses, a contact lens or a head-mounted-device (HMD)); a fabric or a garment-embedded type (example: an electronic clothing); a body-attached type (example: a skin pad or a tattoo); or a bio-implantable circuit. In some example embodiments, the home appliance 100 may include at least one of, for example, a television, a digital video disc (DVD) player, an audio, a refrigerator, a cleaner, an ovens, a microwave, a washing machine, an air purifier, a set top box, a home automation control panel, a security control panel, a media box (example: Samsung HomeSync™, Apple TV™, or Google TV™), a game console (example: Xbox™, PlayStation™), an electronic dictionary, an electronic key, a camcorder, or an electronic frame.

For convenience of description, the home appliance 100 is described below as being limited to a refrigerator, but this is merely an example embodiment and is not limited thereto. The home appliance 100 according to an example embodiment of the disclosure may also be implemented to various forms of home appliances capable of providing a screen through a display 110.

Referring to FIG. 1, the home appliance 100 may include a main body with an opened front surface and a door formed in the interior of the main body that opens or closes a storage to which food is refrigerated and/or stored and the opened front surface of the main body.

The main body may form an exterior of the home appliance 100. The main body may include an inner shape forming the storage and an outer shape forming the exterior of the main body by combining with the inner shape.

The storage may be divided into plurality by a horizontal partition wall and a vertical partition wall. For an example, the storage may be divided into an upper storage and a lower storage, and the storage may be provided with shelves, air-tight containers, and the like.

The storage may be opened and closed by a door. For example, an area of the upper storage may be opened and closed by an upper first door, and the remaining areas of the upper storage may be opened and closed by an upper second door. An area of the lower storage may be opened and closed by a lower first door, and the remaining areas may be opened and closed by a lower second door.

The door may include a handle for easily opening and closing the door. For example, the handle may be formed so as to be long in an upper and lower direction along the space between the upper first door and the upper second door, or formed so as to be long in an upper and lower direction along the space between the lower first door and the lower second door.

Specifically, the home appliance 100 according to an example embodiment may include a display 110 provided on the front surface. Referring to FIG. 1, the display 100 may be provided at one area on the front surface of the door. The home appliance 100 according to an example embodiment may provide various screens through the display 110. The screen may refer to a display area of the display 110. Various screens and visual effects provided through the display will be described in greater detail below.

Figure 2:
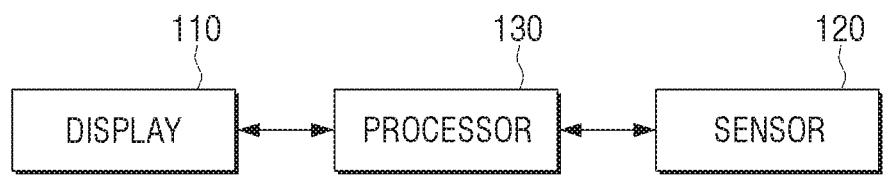
FIG. 2 is a block diagram illustrating an example configuration of an example home appliance according to an embodiment of the disclosure.

FIG. 2 is a block diagram illustrating an example configuration of an example home appliance according to an embodiment of the disclosure.

Referring to FIG. 2, the home appliance 100 may include a display 110, a sensor 120, and a processor 130.

The display 110 may be implemented to various forms of display such as a liquid crystal display (LCD), an organic light emitting diodes (OLED) display, and a plasma display panel (PDP). In the display 110, a driving circuit and a backlight unit, which may be implemented in the form of an a-Si TFT, a low temperature poly silicon (LTPS) TFT, an organic TFT (OTFT) may also be included. The display 110 may be implemented as a touch screen coupled with a touch sensor, a flexible display, a third-dimensional display (3D display), or the like.

In addition, the display 110 according to an example embodiment may include not only a display panel for outputting an image but also a bezel for housing the display panel. Specifically, the bezel according to an example embodiment may include a touch sensor to sense a user interaction. For convenience of description, the display 110 will be described below as being implemented to a touch screen display.

The display 110 according to an example embodiment may receive a touch input of the user, and transmit an electrical signal corresponding to the received touch input to the processor 130. For example, the display 110 may sense a user touch on the display from a change in electric resistance value or capacitance, and may transmit an electrical signal corresponding to coordinates of a touch point to the processor 130. The processor 130 may then identify the coordinates of the touch point of the user based on the received electrical signal. However, this is merely an example embodiment, and the display 110 may be implemented as a touch screen display including a touch panel of various forms capable of sensing a user touch.

The display according to an example embodiment may be provided on the door for user convenience. For example, the display 110 may be provided on at least one from an upper first door or an upper second door for opening or closing the upper storage. The above is an example embodiment and is not limited thereto. For example, the display 110 may be provided on at least one from a lower first door or a lower second door. Further, the home appliance 100 may be provided with a plurality of displays.

The home appliance 100 according to an example embodiment may include a sensor 120. The sensor 120 may be disposed on an exterior of the main body, a door, an interior of a storage, or the like and may sense various signals.

For example, the home appliance 100 may be provided with a sensor sensing an opening or a closing of the main body or the door, and may sense the opening or the closing of the door through the opening and closing sensor. The sensor 120 may, based on sensing the opening or the closing the door, transmit an electrical signal corresponding to the opening or an electrical signal corresponding to the closing to the processor 130.

The sensor 120 according to an example embodiment may sense an opening intensity or a closing intensity when the door is opened or closed. For example, the sensor 120 may sense a degree of vibration of the main body or the door, a volume of a noise generated during the opening and closing of the door, or the like, and the processor 130 may identify the opening and closing intensity of the door based on the degree of vibration, volume of the noise, or the like sensed by the sensor 120. However, this is merely an example embodiment and the home appliance 100 may be provided with a sensor 120 of various types to sense the opening and closing of the door and the intensity of the opening and closing.

The sensor 120 provided in the home appliance 100 according to an example embodiment may, in addition to the opening or the closing of the door, sense movement. Further, the sensor 120 may sense the speed of the movement of the door. For example, the sensor 120 may include an acceleration sensor, a gyro sensor, a movement sensor, or the like, and may sense the movement of the door and the speed and direction of the movement. The sensor 120 may sense the movement speed and movement direction of the door, and the processor 130 may identify whether the door is in the process of being opened or closed based on the sensed movement speed and direction of the door.

The processor 130 controls the overall operation of the home appliance 100.

The processor 130 according to an example embodiment may be implemented as a digital signal processor (DSP), a microprocessor, or a time controller (TCON). However, the above is not limited thereto, and may include one or more of a central processing unit (CPU), a micro controller unit (MCU), a micro processing unit (MPU), a controller, an application processor (AP), a graphics-processing unit (GPU), a communication processor (CP), or an ARM processor, or may be defined to the relevant terms. Further, the processor 130 may be implemented as a System on Chip (SoC) or a large-scale integration (LSI) embedded with a processing algorithm, and may be implemented in the form of a field programmable gate array (FPGA). The processor 130 may perform various functions by executing computer executable instructions stored in a storage (not shown). The processor 130 may access the storage and perform booting using an operation system (O/S) stored in the storage. The processor 130 may then use the various programs, content data, and the like stored in the storage to perform various operations.

Specifically, the processor 130 may display at least one object through the display 110. The object may include various forms as a still image, a moving image, a memo, a drawing (or a sketch), an application, and the like.

The processor 130 according to an example embodiment may control the display 110 to display a board screen on the display 110. The processor 130 may then provide at least one object through the board screen. The board screen refers to a display area that may add or display objects of various forms without the limitation of form and position. For example, according to the related art, a screen displayed through a home appliance 100 may add content such as a memo, a drawing or an image based on a specific template to only a predetermined area, but the board screen refers to a display area capable of freely adding various contents to positions desired by the user without the limitation of position such as a white board. The board screen may be designated as a family board, a display screen, a home screen, window, or the like, but for convenience sake, the above will be collectively referred to as a board screen. Further, the board screen according to various example embodiments of the disclosure may also refer to a display area on the display 110.

The processor 130 according to an example embodiment may provide at least one object through the board screen according to a user command. For example, based on receiving an image from an external device according to the user command, the processor 130 may provide the received image through the board screen.

In another example, based on an application being executed according to the user command, the processor 130 may control the display 100 to display the execution screen of the relevant application on the board screen. As another example, based on receiving a drag input by the user on the board screen, the processor 130 may control the display to display a drawing object corresponding to the drag input on the board screen. However, the above is merely an example embodiment, and the processor 130 may control the display to display various objects such as a memo, weather information, schedule information, and news information on the board screen.

The processor 130 according to an example embodiment may, based on sensing at least one from the door opening or closing using the sensor 120, provide a visual feedback corresponding to the sensed movement to the object. The above will be described in greater detail with reference to FIG. 3.

Figure 3:
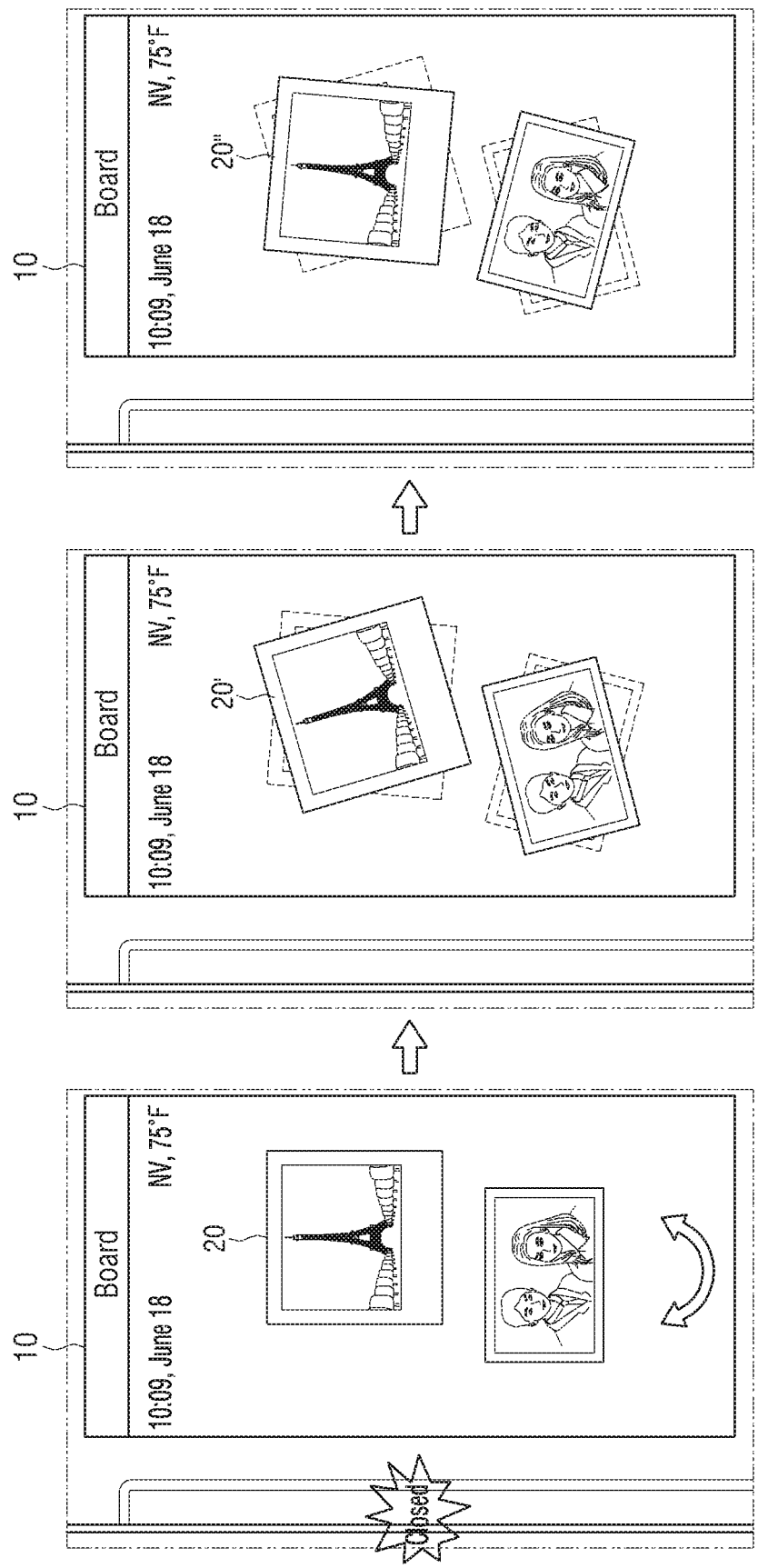
FIG. 3 is a diagram illustrating an example visual feedback according to an embodiment of the disclosure.

FIG. 3 is a diagram illustrating an example visual feedback according to an embodiment of the disclosure.

Referring to FIG. 3, the processor 130 may, based on sensing a closing of the door using the sensor 120, apply a visual feedback to the object displayed on the board screen 10 and display the same. For example, the processor 130 may, based on sensing the closing of the door, apply a visual effect of swaying back and forth or swaying left and right to the object and display the same. Accordingly, the processor 130 may control the display to provide a visual effect to an object such as an image 20, 20', 20", a memo, or the like as if the object is real and not a virtual object.

The processor 130 according to an example embodiment may provide an auditory feedback. For example, the processor 130 may, based on sensing the door opening or closing, provide an auditory feedback in addition to a visual feedback on the object. For example, the processor 130 may pre-store sounds such as sound generated according to picture or bell vibrating or swaying (or sound effects), page turning sound, or the like, and may provide the pre-stored sound together with the visual feedback as auditory feedback. As another example, the processor 130 may only provide auditory feedback to the object other than the visual feedback.

The visual effect of swaying an object back and forth may refer to the visual effect of vibrating left and right at a constant cycle based on an axis or a point. For example, the object may be inclined toward a left side (or right side) at a predetermined angle θ based on an axis. The object may then be inclined toward the right side (or left side) at a decreased angle θ' than the predetermined angle θ. The processor 130 according to an example embodiment may, based on sensing a closing operation of the door, provide a visual feedback of the object performing a vibrating motion left and right around a reference axis or a reference point. Based on time elapsing after the closing operation of the door is sensed, the angle (or amplitude) of the vibrating motion of the object may be decreased. After a threshold time is then elapsed, the angle (or amplitude) during the vibrating motion of the object may become 0. That is, the processor 130 may terminate providing a visual feedback. In this case, the object may return to its original position. The original position referred herein may refer to the position of the object on the board screen 10 before the closing operation of the door is sensed. The visual feedback of the object swaying left and right according to an example embodiment may refer to a visual effect similar to an object performing a simple pendulum motion. Further, the angle (or amplitude) of the simple pendulum motion may decrease inversely proportional to the time elapsed from a point in time the closing operation of the door is sensed through the sensor 120.

The predetermined angle may be a fixed value or may be a variable value proportional to a strength of the closing operation of the door sensed through the sensor 120. A detailed description thereof will be provided hereafter.

As another example, the processor 130 may, based on sensing an opening of the door by the sensor 120, apply a visual effect to the object added on the board screen 10 and display the same. That is, the processor 130 may provide a visual feedback to the object if at least one of an opening or closing is sensed.

As another example, the processor 130 may, based on sensing a movement of the door by the sensor 120, apply a visual effect to the object added on the board screen 10 and display the same. For example, the processor 130 may, based on identifying that the door is in the process of being closed or opened by the sensor 120, provide a visual feedback of the object swaying left and right or a visual feedback swaying back and forth.

The visual feedback of an object swaying back and forth according to another example embodiment may refer to fixing the object to one side and swaying the object back and forth based on the relevant side. For example, the processor 130 may, based on sensing the closing of the door, fix the top side of the object and provide a visual feedback of the object swaying back and forth based on the top side. The processor 130 may decrease the amplitude (or angle) of the swaying of the object inversely proportional to the time elapsed after sensing the door closing. The processor 130 may then terminate the swaying of the object after the elapse of the threshold time and sensing the door closing. In this case, the object may return to its original position. The processor 130 may, based on sensing the door opening or moving in addition to the door closing through the sensor 120, provide a visual feedback to the object.

Referring back to FIG. 2, the processor 130 according to an example embodiment may decide whether to provide a visual feedback based on a type of the object.

The type of the object may include identifying information of the object, size of the object, angle of the object and the like. The identifying information of the object may refer to information corresponding to any one of the various objects capable of being added to the board screen 10 such an image 20, a drawing object, a memo, an icon to execute an application, and an execution screen of an application.

The size of the object may include information on the width and height of the object on the board screen 10. The angle of the object may refer to the degree of incline of the object on the board screen 10. For example, the processor 130 may identify the degree of incline of the image 20 based on the center of the width of the image 20 (Width/2).

The processor 130 according to an example embodiment may provide a visual feedback of a first form based on the object being a first type, and may provide a visual feedback of a second form based on the object being a second type. The above will be described in greater detail with reference to FIG. 4.

Figure 4:
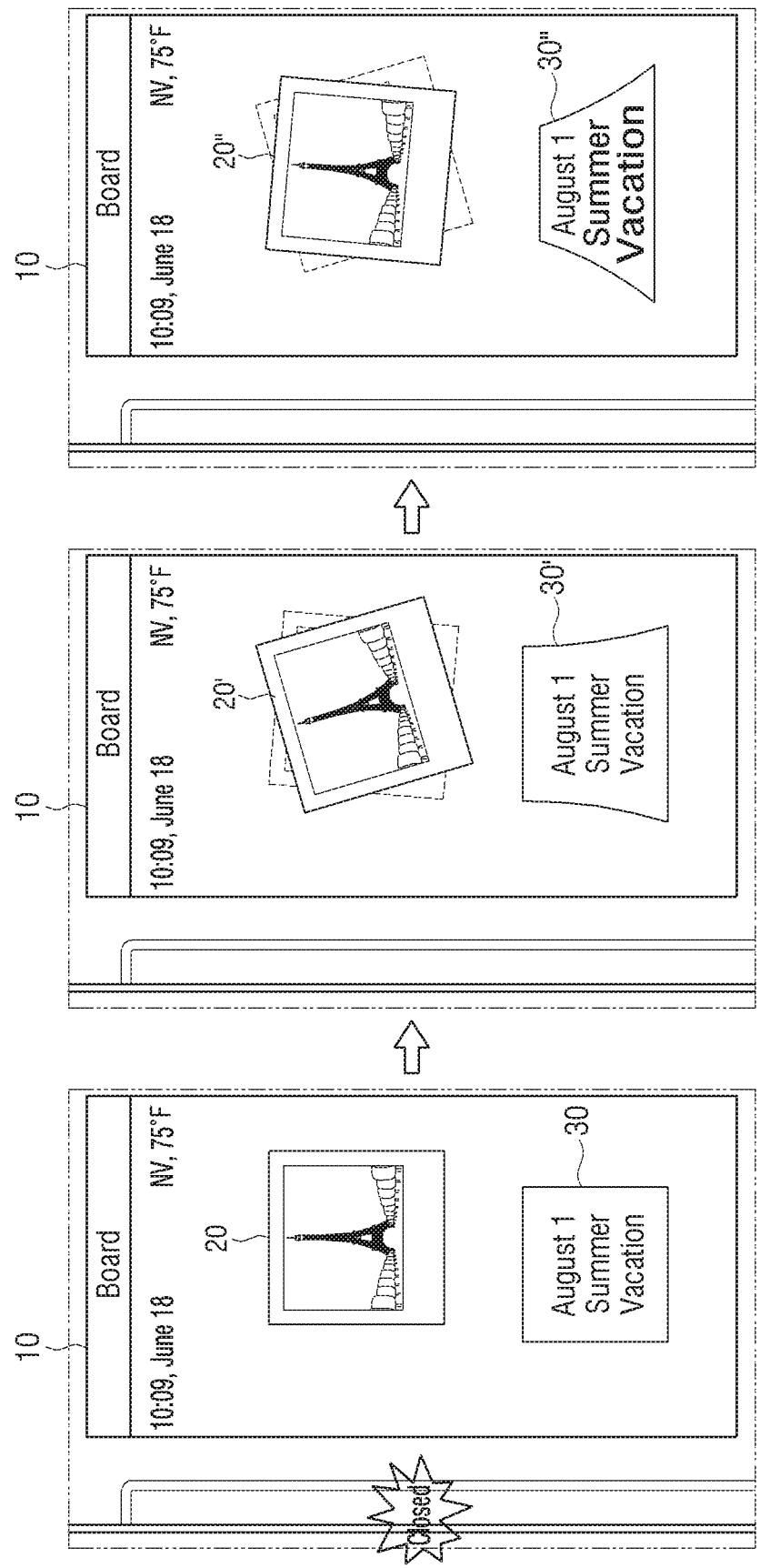
FIG. 4 is a diagram illustrating an example visual feedback according to another embodiment of the disclosure.

FIG. 4 is a diagram illustrating an example visual feedback according to another embodiment of the disclosure.

Referring to FIG. 4, the processor 130 according to an example embodiment may provide a visual feedback of a first form to the object of a first type on the board screen 10, and may provide a visual feedback of a second form to the object of a second type on the board screen 10.

The type of object according to an example embodiment may include at least one of a type of object (for example, an image, a memo, a drawing object, etc.), a size of the object on the board screen 10, or an angle of the object on the board screen 10.

For example, the processor 130 according to an example embodiment may identify the kind of object to a type of object. The processor 130 may then provide a different visual feedback to a plurality of objects based on the identified kinds of objects.

The processor 130 may identify the kind of object based on information on the object. For example, the processor 130 may identify the kind of object as an image 20 based on a file extension of the object corresponding to an image file format on the basis of information on the object. As a different example, the processor 130 may identify the kind of object to a memo 30 based on the file extension of the object corresponding to a text file format on the basis of information on the object. However, this is merely an example embodiment and the processor 130 may identify the kind of object based on the file expansion of the object, file information, format information and the like.

Figure 5:
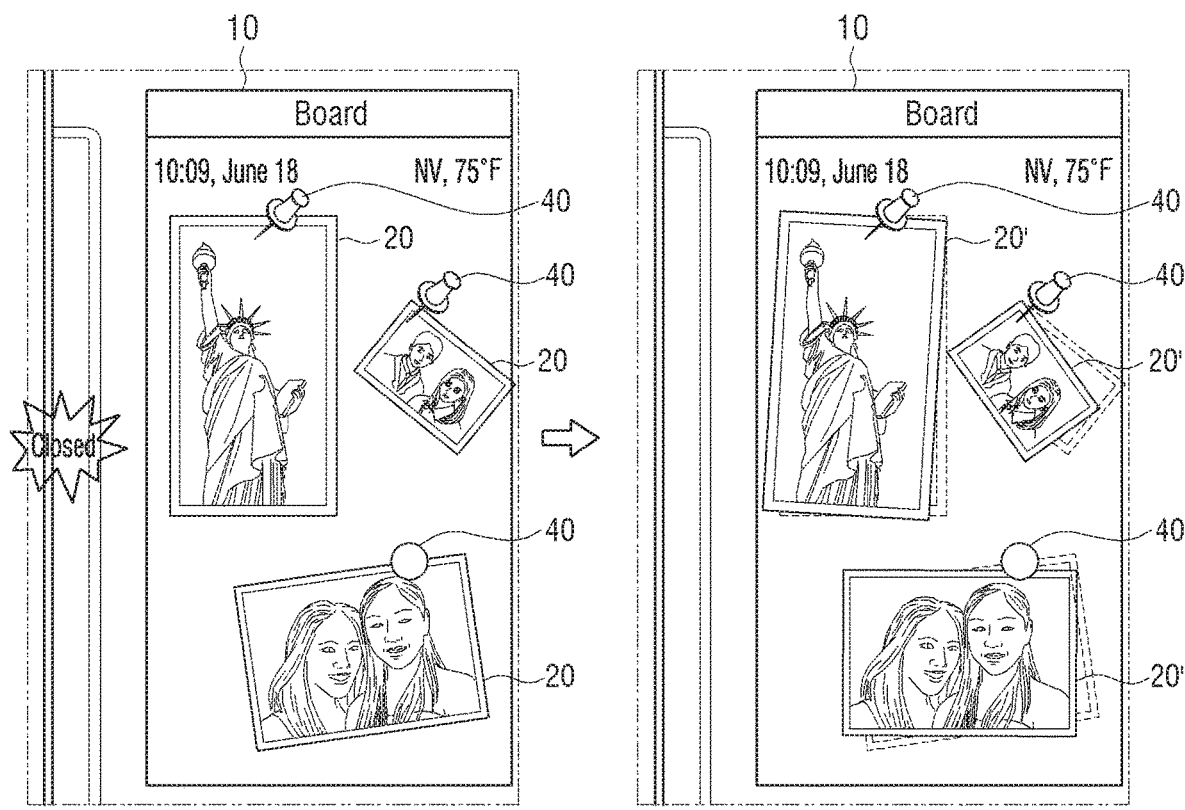
FIG. 5 is a diagram illustrating an example object according to an embodiment of the disclosure.

Referring to FIG. 5, the processor 130 according to an example embodiment may, based on identifying an image 20 on the board screen 10, provide a visual feedback of a first form. The visual feedback of a first form may be feedback that provides a left and right swaying effect based on a longitudinal side passing through the center (Width/2) of the width of the image 20. According to an example embodiment, the processor 130 may, based on sensing the door closing, provide a visual feedback of swaying the image 20 left and right.

According to another example embodiment, the processor 130 may, based on identifying a memo 30 on the board screen 10, provide a visual feedback of a second form. The visual feedback of a second form may be feedback that provides a back and forth swaying effect based on the top side of the memo 30 being a reference axis. According to an example embodiment, the processor 130 may, based on sensing the door closing, provide a visual feedback swaying the memo 30 back and forth.

According to still another example, the processor 130 according to an example embodiment may not provide a visual effect to object corresponding to a certain kind. For example, the processor 130 may not provide a visual feedback to a drawing object, an icon to execute an application, an execution screen of an application, or the like. In this case, the processor 130 may display the icon, execution screen, and the like as is on the board screen 10 even if the door closing is sensed.

The processor 130 according to another example embodiment may identify the size of the object on the board screen 10 as a type of the object. For example, the processor 130 may identify a relatively large size image as an object of a first type in terms of a plurality of images corresponding to a same kind, and may identify a relatively small size image as an object of a second type. In this case, the processor 130 may provide visual feedback so that the object of the first type of a relatively large size has a smaller swaying angle (or amplitude) compared to the object of a second type of a relatively small size. That is, the processor 130 may provide visual feedback of a first from to the object of a first type and may provide visual feedback of a second form to the object of a second type, and in this case the visual feedback of the first form and the second form may be divided according to the strength of a feedback effect. The strength of a feedback effect may be decided according to the maximum swaying angle (or maximum amplitude) of the object. A detailed description of the above will be provided hereafter.

The processor 130 according to another example embodiment may identify a display angle of the object on the board screen 10 as a type of object. For example, any one of a plurality of images may have an inclined angle of 0° on the board screen 10, and the other may have an inclined angle exceeding 45° on the board screen 10. In this case, the processor 130 may provide a visual feedback to only a first object with an inclined angle of 0°, and may not provide a visual feedback to a second object with an inclined angle exceeding 45°. However, this is merely an example embodiment, and is not limited to the specific numbers such as 0° and 45°.

The form of visual feedback according to an example embodiment may be divided according to at least one of a type of the feedback effect, a strength of the feedback effect, or the reference axis of the feedback effect.

The visual feedback of a first form and the visual feedback of a second form according to an example embodiment may be divided according to the type of the feedback effect. The feedback effect of the first type may be an effect of an object swaying left and right based on a specific axis or a specific point, and the feedback effect of a second type may be an effect that fixes a specific side and sways the remaining area back and forth. The home appliance 100 according to an example embodiment may include various feedback effect of a third type and a fourth type. For example, the feedback effect of a third type may be an effect shaking (or vibrating) an object regardless of a specific axis. As another example, the feedback effect of a fourth type may be an effect highlighting an outer area of the object.

The visual feedback of the first form and the visual feedback of the second form according to an example embodiment may be divided according to the strength of the feedback effect. The strength of the feedback effect according to an example embodiment may refer to a swaying intensity of the object. For example, based on the object swaying left and right or back and forth strength may refer to the maximum swaying angle or maximum swaying amplitude. According to another example, based on the visual effect being a shaking effect of the object, the strength of the feedback effect may refer to the shaking intensity. According to still another example, based on the visual effect being an effect highlighting the outer area, the strength of the feedback effect may refer to a strength of brightness (or strength of transparency).

For the convenience of description, the type of object may be referred to as a kind of object (for example, an image, a memo, an application execution screen, etc.) and the form of visual feedback may be referred to as a type of feedback effect (for example, swaying left and right, swaying back and forth) in the description below.

The processor 130 according to an example embodiment may provide a first to third visual feedback successively or randomly to the object regardless of the type of object. For example, the processor 130 may, based on sensing the closing of the door, apply a left and right swaying effect to the image 20. The processor 130 may then, based on re-sensing the closing of the door, apply a left and right swaying effect to the image 20.

Accordingly, the processor 130 may alternatively apply a left and right swaying effect or a back and forth swaying effect to the object. According to another example, the processor 130 may arbitrarily apply any one of the left and right swaying effect or the back and forth swaying effect to the object.

Referring back to FIG. 2, the processor 130 according to an example embodiment may control the display 110 to display a content object including at least one of an image 20 or a memo 30 and a pin object providing the function of fixing the content object to a specific position on the board screen 10. The above will be described in greater detail with reference to FIG. 5.

FIG. 5 is a diagram illustrating an example object according to an embodiment of the disclosure.

Referring to FIG. 5, the processor 130 according to an example embodiment may control the display 110 to display a content object and a pin object 40. The content object may include an image 20, a memo 30, and the like.

The memo 30 may be an object that displays a text recognize from the drawing object corresponding to a text input by the user or a drag input by the user.

The pin object 40 may be an object that provides the function of fixing the content object to a specific position on the board screen 10. The form of the pin object 40 may be a pin, thumbtack, a magnet, or the like, but is not limited thereto.

Referring to FIG. 5, the processor 130 may display a pin object 40 at a position corresponding to user input on the image 20 added to the board screen 10. The processor 130 may then identify a reference axis of the feedback effect used to provide a visual feedback based on the position of the pin object 40.

For example, based on the pin object 40 being positioned on the left upper end, the processor 130 may identify the left upper end where the pin object 40 is positioned as the reference axis or the reference point. Thereafter, based on sensing the closing of the door, the processor 130 may provide a left and right swaying effect based on the left upper end being the reference point.

The position of the pin object 40 may be changed to various positions on the board screen 10 based on the user input. The processor 130 may then, based on the position of the pin object 40 being changed, re-identify the reference axis to provide a swaying effect to the content object based on the changed position.

The processor according to an example embodiment may lock the content object to which the pin object 40 is placed. The lock may be a function that limits the moving position or deleting of the object. For example, the processor 130 may, based on identifying that the pin object 40 is positioned at one area of the content object, limit the movement or deletion of the corresponding content object until the removal of the pin object 40. The above is an example embodiment and is not limited thereto.

Referring back to FIG. 2, the processor 130 according to an example embodiment may decide the strength of the object swaying effect or the strength of the object shaking effect based on the intensity of the door opening or closing detected by the sensor 120. The above will be described in greater detail in FIG. 7.

Figure 6:
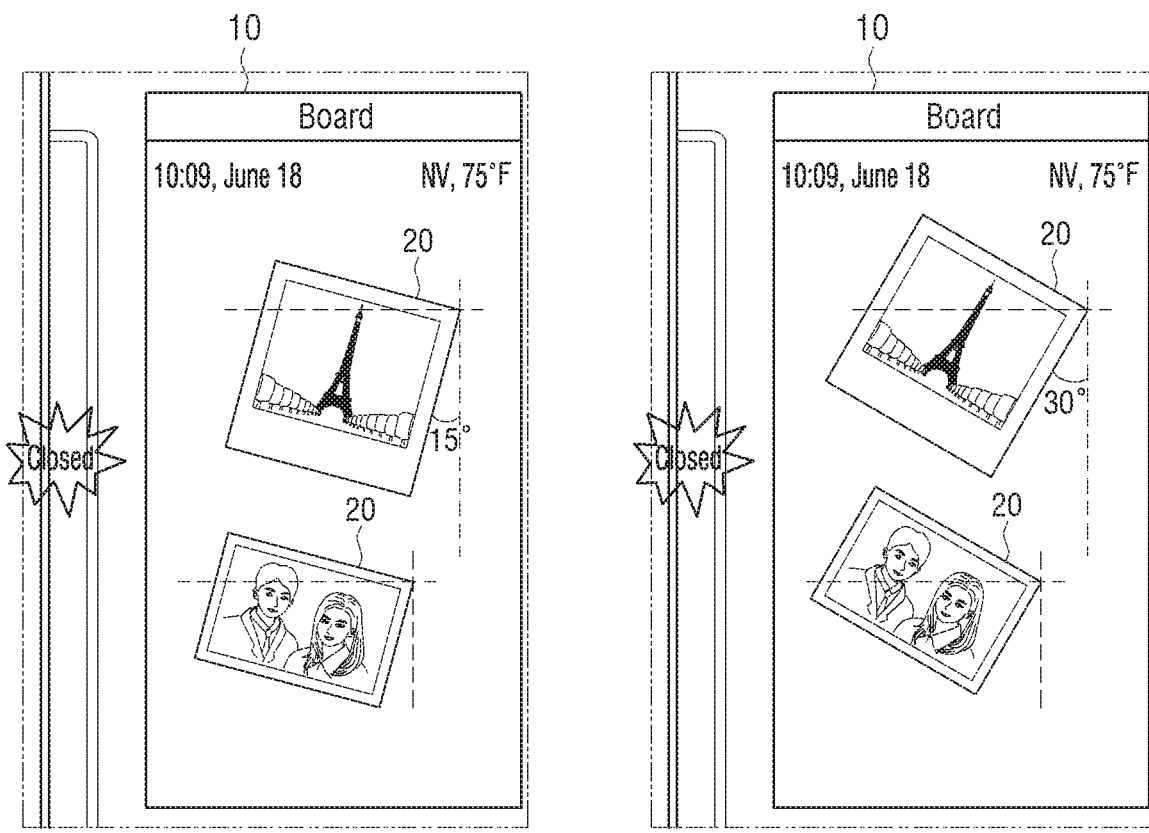
FIG. 6 is a diagram illustrating an example opening strength or an example closing strength according to an embodiment of the disclosure.

FIG. 6 is a diagram illustrating an example opening strength or an example closing strength according to an embodiment of the disclosure.

Referring to FIG. 6, the processor 130 may identify the intensity of the opening and closing of the door based on the electrical signal received through the sensor 120. For example, the intensity of the door opening or the intensity of the door closing may be identified.

The processor 130 may then decide the strength of the swaying effect or the shaking effect based on the intensity of the identified opening and closing. In FIG. 6, a case of the left side compared to the right side sensing the closing of the door at a relatively lesser strength is provided.

The processor 130 may decide on the swaying of the object or the strength of the shaking based on the identified intensity of the door opening and closing. The home appliance 100 according to an example embodiment may divide the opening and closing intensity to a plurality of levels and may store the swaying strength information or shaking strength information corresponding to each of the plurality of levels. For example, the information on the swaying effect strength or the shaking effect strength may be in the form of a lookup table. Based on the intensity of the door opening or the intensity of the door closing being a Lv. 1, the processor 130 may provide a feedback of the image swaying left and right at a 15° angle. According to another example, based on the intensity of the door opening or the intensity of the door closing being a Lv. 3, the processor 130 may provide a feedback of the image swaying left and right at a 30° angle. The above is only an example embodiment and is not limited thereto. For example, the processor 130 may provide feedback of the object to sway back and forth at a 15° angle or a 30° angle based on the identified intensity.

The above is only an example embodiment and is not limited thereto. For example, the processor 130 may, based on sensing door movement through the sensor 120, provide visual feedback to the object. According to an example, although the opening or closing of the door has not been sensed, a case of the door being closed or the door being opened may be identified through the sensor 120. In this case, the processor 130 may decide on the swaying of the object or the strength of the shaking based on the intensity of the movement (for example, speed of movement, etc.).

Referring back to FIG. 2, the processor 130 may, based on the object being an object that includes information related to schedule, provide a different visual feedback based on the difference between a target date identified by the schedule related information and the current time information. The above will be described in greater detail in FIG. 7.

Figure 7:
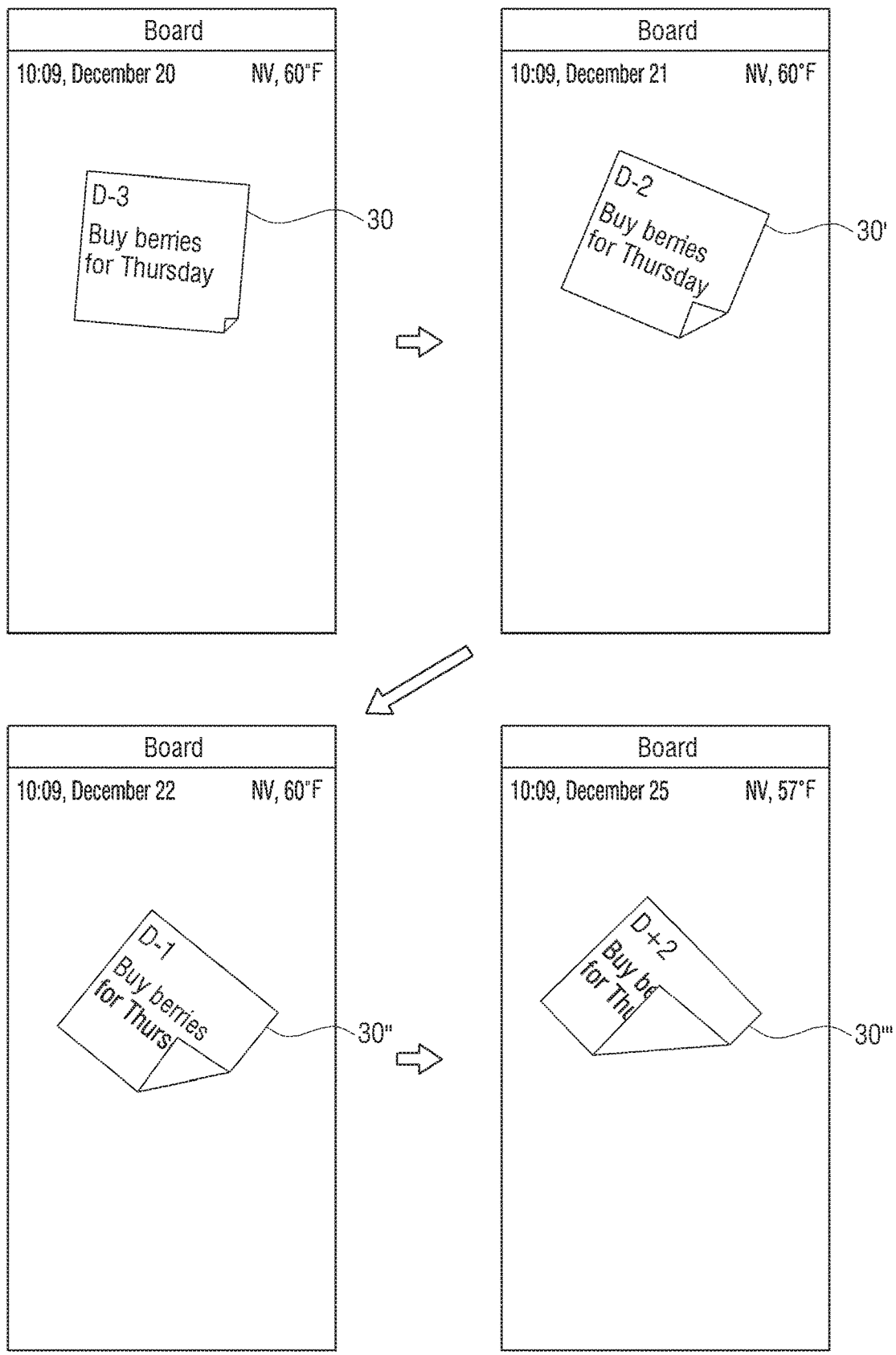
FIG. 7 is a diagram illustrating an example object related to schedule according to an embodiment of the disclosure.

FIG. 7 is a diagram illustrating an example object related to schedule according to an embodiment of the disclosure.

Referring to FIG. 7, the processor 130 may identify the object including the information related to schedule from the objects on the board screen 10. For example, a case of a text included in the memo 30, 30', 30" including the information related to schedule may be provided.

The processor 130 according an example embodiment may, based on an object including information related to schedule, change the form of the object according to the elapse in time and provide the same. For example, a case of the text included in the memo 30 including text on the target date (for example, D-3) may be provided. The processor 130 according to an example embodiment may automatically change the target date included in the memo according to the elapse in time. In FIG. 7, the processor 130 changed the target date included in the memo from D-3 to D-2 as the current time is changed from December $20^{th}$ to December $21^{st}$.

The processor 130 according to an example embodiment may, in addition to adjusting (or changing) information related to schedule included in the object based on the current time, provide a visual feedback. For example, the form of the object may be changed according to an elapse in time. Referring to FIG. 7, as the target date arrives, the processor 130 may adjust the inclined angle of the memo 30 and may adjust the size of one area folded in the memo 30. The above is an example embodiment and is not limited thereto.

According to another example, the processor 130 may, based on the current time approaching the target date according to information related to schedule included in the object, highlight the surrounding outer area of the object.

The processor 130 according to an example embodiment may, based on determining that the current time has elapsed the target date included in the object, display the area exceeding 50% of the object as a folded part. For example, in FIG. 7, based on the current time elapsing the target date (D+2), the processor may process the area exceeding 50% of the memo 30''' as the folded area. The above is only one example embodiment and are not limited thereto. The processor 130 according to the various example embodiments of the disclosure may provide a visual feedback as the current time approaches a specific time based on information related to schedule included in the object, and may provide a different visual feedback based on the current time elapsing the specific time.

The processor 130 according to another example embodiment may, based on sensing the door closing or opening, identify whether the current time elapsed a specific time based on information related to schedule included in the object. The processor 130 may then, based on identifying that the current time elapsed a specific time, provide a visual feedback to the object including the corresponding specific time. The above will be described in greater detail with reference to FIG. 8.

Figure 8:
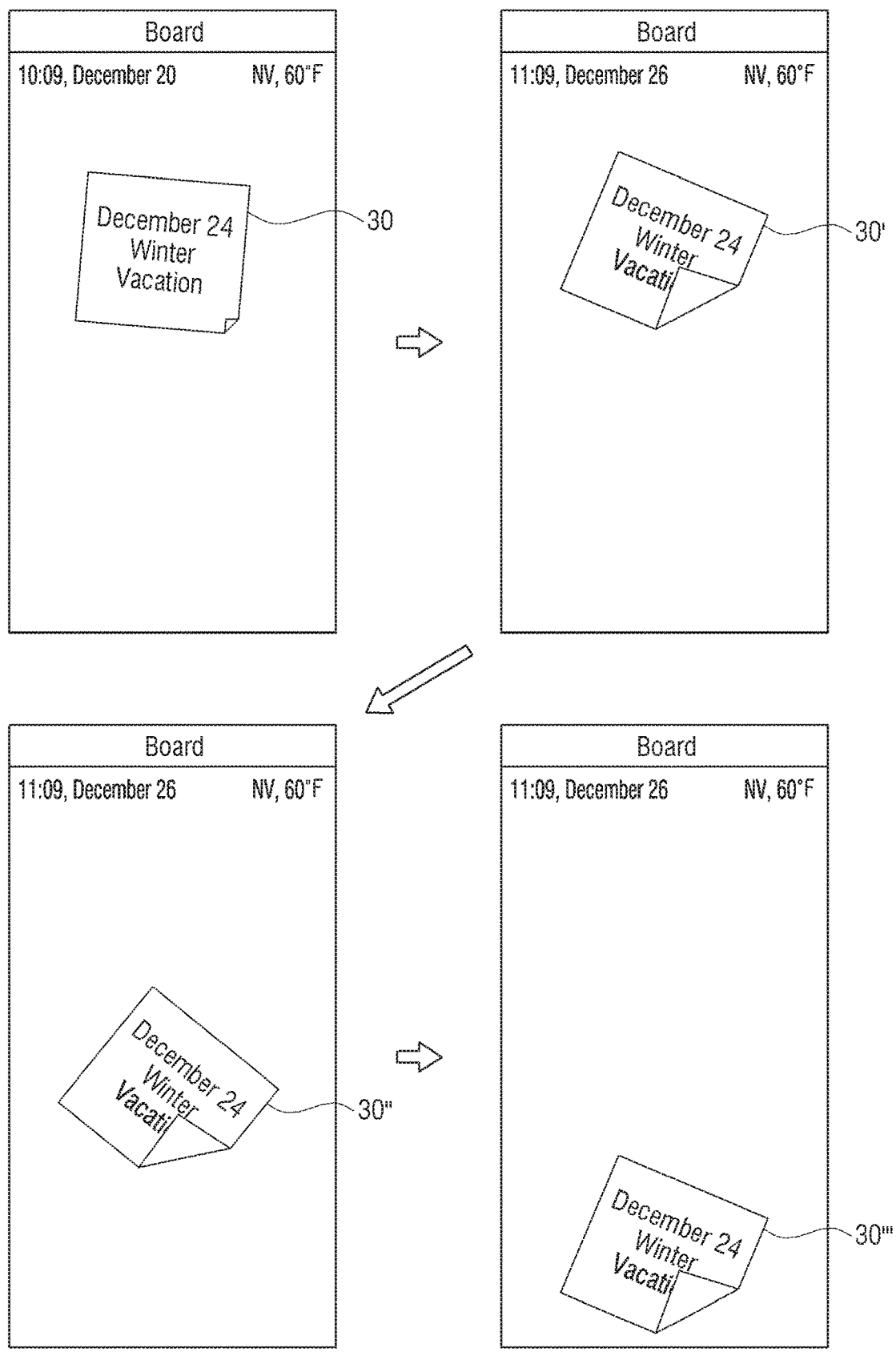
FIG. 8 is diagram illustrating an example object related to schedule according to an embodiment of the disclosure.

FIG. 8 is diagram illustrating an example object related to schedule according to an embodiment of the disclosure.

Referring to FIG. 8, the processor 130 according to an example embodiment may determine the difference between the target date corresponding to the information related to schedule included in the memo 30 and the current time information. According to an example, based on 'December $24^{th}$' being identified as information related to schedule in a memo 30, the processor 130 may determine the difference between 'December $24^{th}$' and the current date 'December $20^{th}$' (for example, D-4). The processor 130 may then provide a visual feedback corresponding to the determined result to the memo 30.

Referring to FIG. 8, the processor 130 may obtain a target date 'December $24^{th}$' based on information related to schedule obtained from a text included in the memo 30. The processor 130 may then recognize that the target data has elapsed based on the difference between the target date 'December $24^{th}$' and the current date 'December $26^{th}$'. In this case, the processor 130 may provide a visual effect of dropping the memo 30 to a lower area on the board screen 10.

The processor 130 may, based on sensing at least one from the closing, opening, or moving of the door, move the object including information related to schedule, which the target date has elapsed based on the current time, to an area on the board screen 10. For example, the processor 130 may, based on identifying that the current date 'December $26^{th}$' elapsed the target date 'December $24^{th}$' within a threshold value (for example, D+2), position the memo 30 including information related to schedule to an area on the board screen 10. According to an example, the processor 130 may provide a visual feedback of dropping the memo 30 to a right lower end area or a left lower end area on the board screen 10.

According to another example, the processor 130 may, based on identifying that the current time elapsed the target date obtained from the object, adjust the transparency of the object. The processor 130 may, based on identifying that the current time elapsed exceeding the threshold value (for example, D+2) of the target date obtained from the object, adjust the transparency of the object to 90 to 100%.

The information related to schedule may be set by the user when generating the memo 30. Further, the processor 130 may perform an optical character recognition (OCR) on the drawing object and the like to recognize text and obtain information related to schedule based on the recognized text.

Referring back to FIG. 2, the home appliance 100 according to an example embodiment may include a sensor (not shown) that detects the user. The processor 130 may then, based on detecting user movement at the front surface of the display 100 by the sensor, provide a visual feedback corresponding to user movement. The above will be described in greater detail with reference to FIG. 9.

Figure 9:
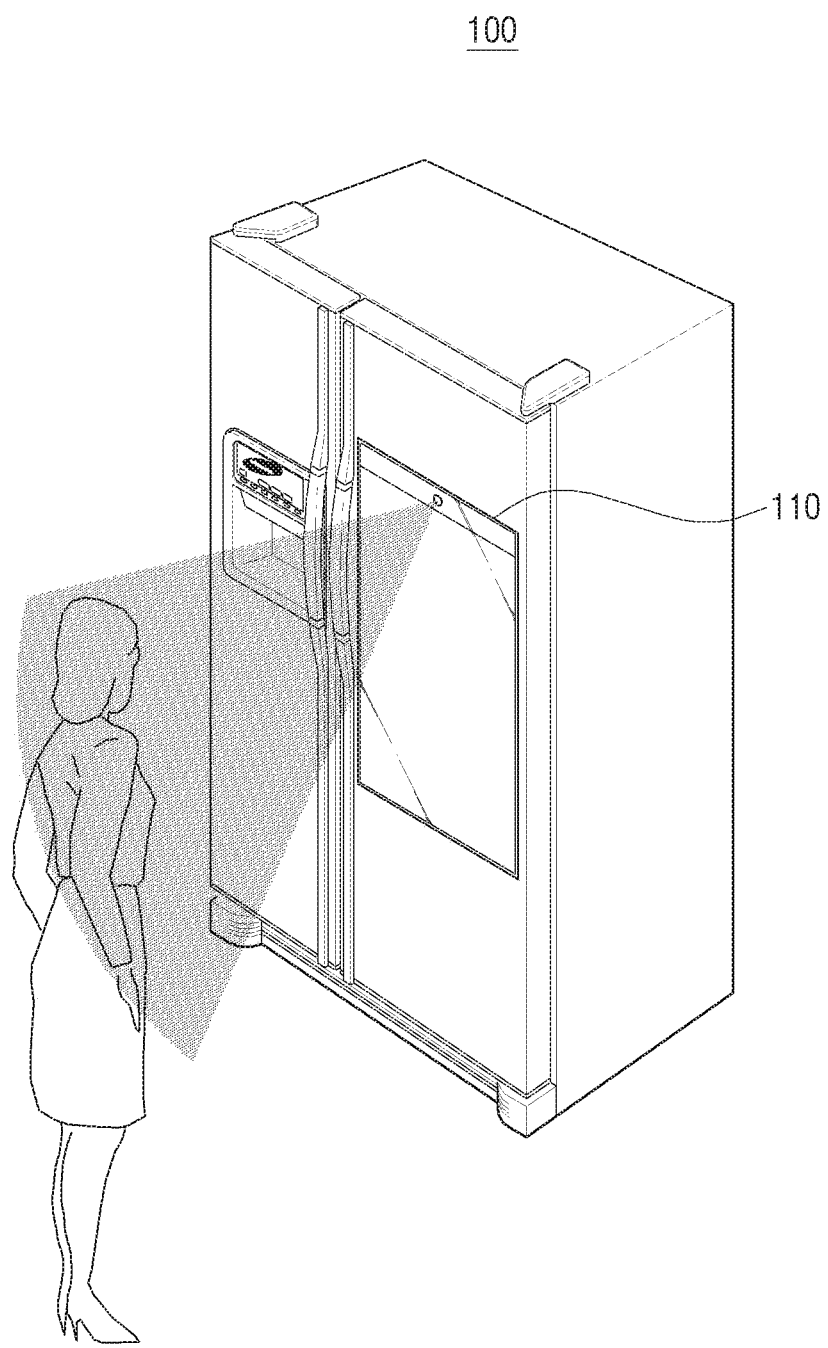
FIG. 9 is a diagram illustrating an example sensor according to an embodiment of the disclosure.

FIG. 9 is a diagram illustrating an example sensor according to an embodiment of the disclosure.

The home appliance 100 according to an example embodiment may sense a user through a sensor provided at the front surface thereof. For example, the sensor senses a user in proximity within a threshold distance, and the processor 130 may perform an operation corresponding to the sensed user.

The home appliance 100 may be provided with a wake up function that activates automatically when a user approaches within a certain range. For example, the display 110 may be activated when a user approaches within a certain range. The processor 130 may control the display 110 to display a board screen 10 prior to the display being turned-off. The processor 130 may then provide a visual feedback to the object added to the board screen 10. For example, based on a display 110 being turned-on as a user is sensed, the processor 130 may apply a swaying effect to the object on the board screen 10.

In addition, based on a certain time elapsing after the user moves away from the certain range, the processor 130 may inactivate the display 110. That is, the display 110 may be in a turned-off state.

Figure 10:
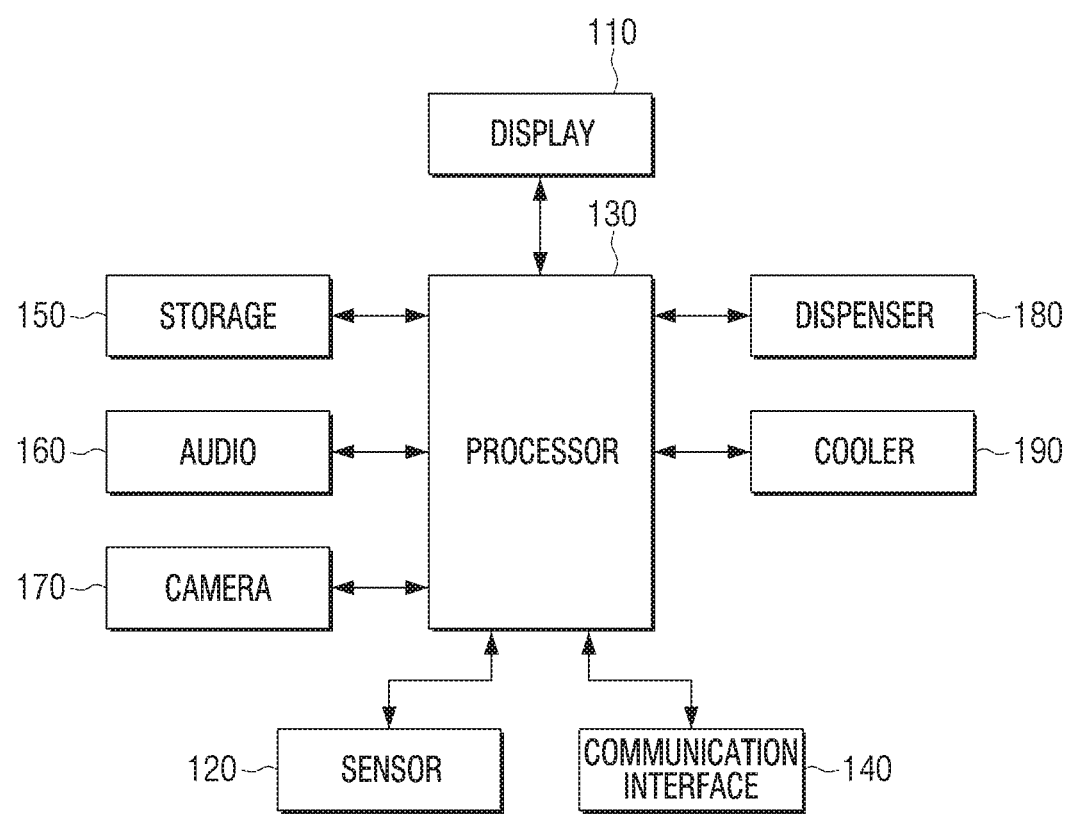
FIG. 10 is a block diagram illustrating an example detailed configuration of an example home appliance according to an embodiment of the disclosure.

FIG. 10 is a block diagram illustrating an example detailed configuration of an example home appliance according to an embodiment of the disclosure.

Referring to FIG. 10, the home appliance 100 may include a display 110, a sensor 120, a processor 130, a communication interface 140, a storage 150, an audio 160, a camera 170, a dispenser 180, and a cooler 190. From the configurations disclosed in FIG. 3, a detailed description of the configuration overlapping with the configuration of FIG. 2 will be omitted.

The display 110 may provide various content screens capable of being provided through the home appliance 100. The content screen may include various content such as images, videos, texts and music, an application execution screen including the various content, a graphical user interface (GUI) screen, or the like.

The display may be implemented to various forms such as a liquid crystal display (LCD), an organic light-emitting diode (OLED), a liquid crystal on silicon (LCoS), a digital light processing (DLP), a micro LED, a quantum dot (QD) display panel, or the like, but are not limited thereto. Further, the display may, in some cases, also be implemented as a flexible display, a transparent display, or the like.

In addition, the display 110 according to an example embodiment, may include not only a display panel outputting an image, but also a bezel housing the display panel. Specifically, the bezel according to an example embodiment may include a touch sensor (not shown) for sensing user interaction.

The display 100 provided in the home appliance 100 may display various screens generated from the graphics-processing unit. The home appliance 100 may include the display 110 as an element, but may transmit a signal corresponding to the screen to an external device coupled through an interface (not shown) and may display the various screens through the display of the external device. For example, the display 110 may display a screen of the external device through a mirroring function.

Specifically, the display 110 may display an image 20, a memo 30, a drawing object, an icon for executing an application, or the like according to the control of the processor 130.

The home appliance 100 may, in addition to the sensor detecting a user by being disposed at the front surface of the display 110, further include inner temperature sensors (not shown) sensing the inner temperature of the main body. For example, the inner temperature sensors may be installed at each of a plurality of storages (for example, upper storage, lower storage, etc.), sense the temperature of each of the plurality of storages, and transmit an electrical signal corresponding to the sensed temperature to the processor 130. The processor 130 may then perform an operation corresponding to the sensed temperature. For example, the processor 130 may perform an operation to control the inner temperature, an operation to provide the inner temperature through the display 110, or the like. The each of the inner temperature sensors may include a thermistor that changes electrical resistance according to temperature.

The processor 130 may control the overall operation of the home appliance 100 using various programs stored in the storage 150.

Specifically, the processor 130 may include a random-access memory (RAM), a read only memory (ROM), a main CPU, a first to nth interface, and a bus.

The RAM, the ROM, the main CPU, the first to nth interface and the like may be interconnected through the bus.

In the ROM instruction set or the like for system booting may be stored. Based on a turn-on instruction being input and power being supplied, the main CPU may copy the O/S stored in the storage 150 according to the instruction stored in the ROM to the RAM, and may boot the system by executing the O/S. Based on the booting being completed, the main CPU may copy the various application programs stored in the storage to the RAM and may execute an application program stored in the RAM to perform various operations.

The main CPU accesses the storage 150 and performs booting using the O/S stored in the storage 150. Further, the main CPU may perform various operations using the various programs, content data, and the like stored in the storage 150.

The first to nth interface may be coupled with the various elements described above. An interface from the interfaces may be a network interface coupled with an external device through a network.

The processor 130 may perform a graphics processing function (a video processing function). For example, the processor 130 may generate a screen including various objects such as an icon, an image, and a text using a calculator (not shown) and a renderer (not shown). The calculator (not shown) may calculate attribute values such as coordinates, forms, sizes and colors of each object which may be displayed according a layout of the screen based on the received control instruction. Further, the renderer (not shown) may generate a screen of various layouts including objects based on the attribute values calculated in the calculator (not shown). Further, the processor 130 may perform various image processing such as decoding, scaling, noise filtering, frame rate conversion, and resolution conversion on the video data.

The processor 130 may perform processing of audio data. Specifically, the processor 130 may perform various processing such as decoding, amplifying, noise filtering or the like on the audio data.

The communication interface 140 including circuitry is configured to perform communication with the various forms of external devices according to the various forms of communication methods. Specifically, the communication interface 140 may transmit and receive various data such as an image and a text by performing communication with a user terminal device, a server of the like.

The communication interface 140 may include a Wi-Fi module, a Bluetooth module, an infrared communication module, a wireless communication module or the like. Each communication module may be implemented as at least one form of a hardware chip.

The processor 130 may perform communication with various external devices using the communication interface 140. The external device may include a display device such as a TV, an image processing device such as a set-top box, an external server, a control device such as a remote control, an audio output device such as a Bluetooth speaker, a lighting device, a smart cleaner, a home appliance such as a refrigerator, a server such as an Internet of Things (TOT) home manager, or the like.

The Wi-Fi module and the Bluetooth module may perform communication using a Wi-Fi method and a Bluetooth method, respectively. In the case of using a Wi-Fi module or a Bluetooth module, various connection information such as a service set identifier (S SID) and a session key may be transmitted and received first, and various information may be transmitted and received after communication connection using the same.

The infrared communication module performs communication according to infrared data association (IrDA) technology that transmits data wireless to local area using infrared ray between visible rays and millimeter waves.

The wireless communication module may include at least one communication chip performing communication according to various communication standards such as Zig- bee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods described above.

Additionally, the communication interface 140 may include at least one of a local area network (LAN) module, Ethernet module, or a wired communication module performing communication using a pair cable, a coaxial cable, an optical fiber cable, or the like.

According to an example, the communication interface 140 may utilize the same communication module (for example, a Wi-Fi module) to communication with an external device such as a remote control and an external server.

According to another example, the communication interface 140 may utilize an external device such as a remote control and a different communication module (for example, a Wi-Fi module) to communicate with an external server. For example, the communication interface 140 may utilize at least one of an Ethernet module or a Wi-Fi module to communicate with an external server, and may utilize a Bluetooth (BT) module to communicate with an external device such as a remote control. However, the above is only one example embodiment, and the communication interface 140 may utilize at least one communication module from the various communication modules based on communicating with the plurality of external devices or the external server.

The storage 150 may store various data such as the operating system (O/S) software module for driving the home appliance 100 and various multimedia content. Specifically, the storage 150 may store information on the board screen, the image added to the board screen, the drawing object, or the like.

The storage 150 may be implemented as an internal memory such as a read-only memory (ROM; for example, an electrically erasable programmable read-only memory (EEPROM)) and a random-access memory (RAM) included in the processor 130, or implemented as a memory separate from the processor 130. In this case, the storage 150 may be implemented in an embedded memory form to the home appliance 100 according to data storage use or to a memory form detachable from the home appliance 100. For example, in the case of data required for driving the home appliance 100, the data is stored in the embedded memory of the home appliance 100, and in the case of data required for the expansion function of the home appliance 100, the data may be stored in the memory detachable from the home appliance 100. The embedded memory in the home appliance 100 may be may be implemented as at least one of a volatile memory (example: a dynamic RAM (DRAM), a static RAM (SRAM), or a synchronous dynamic RAM (SDRAM), etc.), a non-volatile memory (example: a one-time programmable ROM (OTPROM), a programmable ROM (PROM), an erasable and programmable ROM (EPROM), an electrically erasable and programmable ROM (EEPROM), a mask ROM, a flash ROM, a flash memory (example: NAND flash or NOR flash, etc.), a hard drive, or a solid state drive (SSD)), and in the case of a memory detachable from the home appliance 100, the memory may be implemented in a form such as a memory card (for example, a compact flash (CF), a secure digital (SD), a micro secure digital (Micro-SD), a mini secure digital (Mini-SD), an extreme digital (xD), a multi-media card (MMC), etc.), an external memory (for example, a universal serial bus (USB) memory) connectable to a USB port, or the like.

The audio 160 may convert an electrical signal received from the processor 130 to an acoustic signal and may include a speaker outputting the converted acoustic signal. The processor 130 according to an example embodiment may output an acoustic signal through the audio 160 when a predetermined event is generated. For example, the home appliance 100 may include a briefing mode, and the processor 130 may control the audio 160 to output a current time, a current position, weather corresponding to the current position, a to-do list application, and the like when operating a briefing mode. According to another example, the home appliance 100 may control the audio 160 to output a beep sound when the opening of the door is continued for a threshold time or more.

Specifically, the audio 160 may include a microphone (not shown) that converts an acoustic signal to an electrical signal and transmit to the processor 130. The processor 130 may identify the intensity of the door opening or closing based on a sound signal detected by the microphone when the door is opened or closed. For example, based detecting on a sound signal with a relatively large decibel (dB), the processor 130 may determine the intensity of the opening or closing great. The processor 130 may then decide on the swaying strength of the swaying effect or the shaking strength according to the shaking effect on the object based on the determined intensity.

The camera 170 may photograph an image, convert the image to an electrical signal, and transmit the signal to the processor 130.

The camera 170 may include a plurality of photodiodes that convert an optical signal to an electrical signal, and the plurality of photodiodes may be disposed two-dimensionally. The camera 170 may include a charge-coupled device (CCD) image sensor in which the plurality of photodiodes are disposed two-dimensionally or a complementary metal oxide semiconductor (CMOS) image sensor.

Specifically, the camera 170 is provided in the interior of the storage and may obtain an image of a food stored in the storage. The processor 130 may then control the display 110 to display a food image obtained from the camera 170.

According to an example embodiment, based on the home appliance 100 being implemented as a refrigerator, the refrigerator may include a dispenser 180 and a cooler 190.

The dispenser 180 may discharge water or ice according to user input. The home appliance 100 may provide water or ice to the outside without the opening and closing of the door through the dispenser 180.

The dispenser 180 may include a dispenser lever for receiving a discharge command for water or ice from the user, a dispenser nozzle for discharging water or ice, and a dispenser display panel for displaying the operating state of the dispenser 180.

The dispenser 180 according to an example embodiment may be installed in the main body or the exterior of the door. For example, as illustrated in FIG. 1, the dispenser 180 may be installed on the upper first door. However, the above is not limited thereto, and the dispenser 180 may be variously provided in an area of the main body or the door.

The cooler 190 may provide cool air to the storage. The cooler 190 may maintain the temperature of the storage within a certain range using the evaporation of the refrigerant.

The cooler 190 may include a compressor for compressing the refrigerant in a gaseous state, a condenser for converting the refrigerant in a compressed gaseous state to a liquid state, an expander for decompressing the refrigerant in the liquid state, and an evaporator for state converting the decompressed refrigerant in liquid state to a gaseous state.

The cooler 190 may cool the storage air using a phenomenon that state converts a refrigerant in liquid state to a gaseous state and absorbs heat energy of ambient air.

However, the above is only one example embodiment, and the cooler 190 is not necessarily limited to including a compressor, a condenser, an expander, and an evaporator. For example, the cooler 190 may include a Peltier device utilizing the Peltier effect. The Peltier effect refers to the occurrence of a heating phenomenon in any one of the metals and the occurrence of a heat absorbing phenomenon in the other metal, when current is made to flow on a contact surface where different types of metals are in contact. The cooler 190 may cool the air of the storage utilizing a Peltier device.

According to another example, the cooler 190 may include a magnetic cooling device using a magneto-caloric effect. The magneto-caloric effect refers to a specific material (magneto-caloric material) discharging heat when magnetized, and a specific material (magneto-caloric material) absorbing heat when demagnetized. The cooler 190 may use the magnetic cooling device to cool the air in the storage.

The home appliance 100 according to an example embodiment may include a user interface and an input and output interface.

The user interface (not shown) may be implemented as a device such as a button, a touch pad, a mouse, and a keyboard, or also as a touch screen capable of performing both the display function described above and the manipulation input function. The button may be a button of various types such as a mechanical button, a touch pad, a wheel, or the like formed on an arbitrary region such as a front part, a side part, a back part, or the like, of an exterior of the main body, the door, or the like of the home appliance 100.

The input and output interface (not shown) may be an interface of any one of the high-definition multimedia interface (HDMI), the mobile high-definition link (MHL), the universal serial bus (USB), the display port (DP), the Thunderbolt, the video graphics array (VGA) port, the RGB port, the D-subminiature (D-SUB), and the digital visual interface (DVI). Although the home appliance 100 has been described as a refrigerator, the home appliance 100 may be implemented as a display device, may be connected to the refrigerator through the input and output interface provided in the display device, and may be implemented as a display device that is detachable from an area of the refrigerator.

The home appliance 100 may receive a user voice signal from the external device including the microphone. In this case, the received user voice signal may be a digital voice signal, but may be an analog voice signal according to an example embodiment. For example, the home appliance 100 may receive a user voice signal through a wireless communication method such as a Bluetooth or Wi-Fi. The external device may be implemented as a remote-control device or a smart phone.

The home appliance 100 may, for the voice recognition of the voice signal received from the external device, transmit the corresponding voice signal to the external server.

In this case, the communication module for communicating with the external device and the external server may be implemented as one or implemented separately. For example, communication with the external device may be performed using a Bluetooth module, and communication with the external server may be performed using the Ethernet modem or the Wi-Fi module.

The home appliance 100 may further include a tuner and a demodulator according to an example embodiment.

The tuner (not shown) may receive may receive a radio frequency (RF) broadcasting signal by tuning a channel selected by a user or all pre-stored channels from the RF broadcasting signals received through the antenna.

The demodulator (not shown) may receive and demodulate a digital intermediate frequency (DIF) signal converted by the tuner, and may perform channel decoding, or the like.

Figure 11:
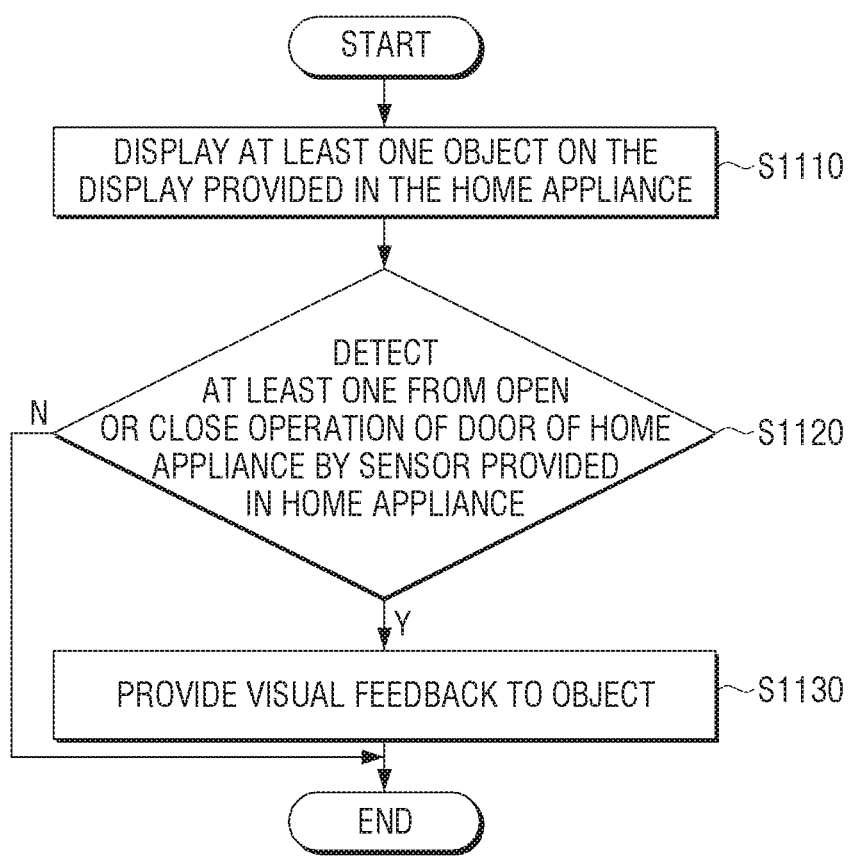
FIG. 11 is a flow chart illustrating an example control method of an example home appliance according to an embodiment of the disclosure.

FIG. 11 is a flow chart illustrating an example control method of an example home appliance according to an embodiment of the disclosure.

A control method of a home appliance according to an example embodiment of the disclosure may first display at least one object in the display provided in the home appliance (operation S1110).

Based on sensing at least one of the door opening or closing of the home appliance (operation S1120) by a sensor provided in the home appliance, a visual feedback may then be provided to an object (operation S1130).

The providing of a visual feedback (operation S1130) may include deciding whether to provide a visual feedback based on a type of the object.

In addition, the providing the visual feedback (operation S1130) may include providing a visual feedback of a first form based on the object being a first type, and providing a visual feedback of a second form based on the object being a second type. The visual feedback of the first form and the second form may have a difference in at least one of a type of feedback effect, a strength of feedback effect or a reference axis of feedback effect.

In addition, a visual feedback may be a swaying effect, and the providing of a visual feedback (operation S1130) may include providing a pin object that provides a content object comprising at least one from an image or a memo and a function fixing the content object to a specific position of a display area of the display, and providing the swaying effect to the content object with the position of the pin object as a reference axis.

In addition, the visual feedback may include at least one from a left and right swaying effect, a front and back swaying effect, or a shaking effect.

The providing the visual feedback according an example embodiment S1130 may include deciding a swaying strength according to the swaying effect or a shaking strength according to the shaking effect based on an intensity of the door opening or closing detected by the sensor.

The providing the visual feedback (operation S1130) may include identifying an intensity of the door opening or closing based on a sound detected by a microphone provided in the home appliance and deciding on a swaying strength according to the swaying effect or a shaking strength according to the shaking effect based on the intensity of the door opening or closing.

In addition, the providing the visual feedback (operation S1130) may include, based on the object being an object comprising information related to schedule, providing a different visual feedback based on a difference between a target date identified by the information related to schedule and current time information.

The providing the visual feedback (operation S1130) may include, based on identifying that current time has elapsed the target date, providing a visual feedback that drops the object to a lower area on the display area of the display.

In addition, the providing the visual feedback (operation S1130 may include, based on detecting a movement of a user at the front surface of the display by the sensor, providing a visual feedback corresponding to the movement of the user.

The methods according to various example embodiments as described above may be implemented in the form of an application which may be installed in electronic devices of the related art.

In addition, the methods according to various example embodiments as described above may be implemented by a software upgrade or a hardware upgrade to electronic devices of the related art.

In addition, the various example embodiments as described above may be performed through an embedded server provided in the electronic device or an external server of at least one of the display devices.

According to an example embodiment, the various embodiments described above may be implemented as a software including instructions stored in a machine-readable storage media (example: computer). The machine may call a stored instruction from the storage medium, and as a device capable of operating according to the called instruction, may include an electronic device (example: home appliance (A)) according to the disclosed example embodiments. Based on an instruction being executed by a processor, the processor may directly, or under the control of the processor perform a function corresponding to the instruction using other elements. The instructions may include a code generated by a compiler or executed by an interpreter. The machine-readable storage media may be provided in the form of a non-transitory storage medium. The term 'non-transitory' only means that the storage medium does not include a signal and is tangible, and that the term does not distinguish data being semi-permanently or temporarily stored in the storage medium.

In addition, according to an example embodiment of the disclosure, the method according to various example embodiments as described above may be provided included in a computer program product. The computer program product may be exchanged between a seller and a purchaser as a commodity. The computer program product may be distributed in the form of a machine-readable storage medium (example: compact disc read only memory (CD-ROM)) or distributed online through an application store (example: Play Store™). In the case of on-line distribution, at least a portion of the computer program product may be at least stored temporarily in a storage medium such as a manufacturer's server, a server of an application store, or a memory of a relay server, or generated temporarily.

In addition, each of the elements (example: a module or a program) according to various example embodiments as described above may be composed of a single entity or a plurality of entities, and some sub-elements of the above-mentioned sub-elements may be omitted, or other sub-elements may be further included in the various example embodiments. Alternatively or additionally, some elements (example: modules or programs) may be integrated into one entity to perform the same or similar functions performed by each respective element prior to integration. Operations performed by a module, a program, or another element, in accordance with the various example embodiments, may be performed sequentially, in parallel, repetitively, or in a heuristically manner, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A home appliance comprising:
a door;
a sensor to detect whether the door is opened or closed;
a display in the door; and
a processor configured to:
control the display in the door to display one or more objects, and
based on sensing, by the sensor, at least one of an opening or a closing of the door, provide visual feedback to the one or more objects,
wherein the processor is further configured to, based on the one or more objects being an object that includes information related to a schedule, provide a different visual feedback based on a difference between a target date identified by the information related to schedule and a current time information.

2. The home appliance according to claim 1, wherein the processor is further configured to identify whether to provide visual feedback based on a type of the one or more objects.

3. The home appliance according to claim 1,
wherein the processor is further configured to:
provide a first visual feedback of a first form based on the one or more objects being a first type, and
provide a second visual feedback of a second form based on the one or more objects being a second type, and
wherein the first visual feedback and the second visual feedback differ in at least one of a type of feedback effect, a strength of feedback effect or a reference axis of feedback effect.

4. The home appliance according to claim 1,
wherein the visual feedback comprises a swaying effect, and
wherein the processor is further configured to:
control the display to provide a pin object that provides a content object comprising at least one of an image or a memo and a function that fixes the content object to a specific position of a display area of the display, and
provide the swaying effect to the content object with the position of the pin object as a reference axis.

5. The home appliance according to claim 1, wherein the visual feedback comprises at least one of a left and right swaying effect, a back and forth swaying effect, or a shaking effect.

6. The home appliance according to claim 5, wherein the processor is further configured to identify a swaying strength according to the swaying effect or a shaking strength according to the shaking effect based on an intensity of the opening or the closing of the door detected by the sensor.

7. The home appliance according to claim 5 further comprising:
a microphone,
wherein the processor is further configured to:
identify an intensity of the door opening or closing based on a sound detected by the microphone, and
identify a swaying strength according to the swaying effect or a shaking strength according to the shaking effect based on the intensity of the door opening or closing.

8. The home appliance according to claim 1, wherein the processor is further configured to, based on the current time being identified as having elapsed the target date, provide a visual feedback that drops the object to a lower area of a display area of the display.

9. The home appliance according to claim 1 further comprising:
a sensor to detect a user,
wherein the processor is further configured to, based on detecting a movement of a user at a front surface of the display by the sensor, provide a visual feedback corresponding to the movement of the user.

10. The home appliance according to claim 1, wherein the processor is further configured to:
control the display to provide a board screen;
control the display to display the one or more objects on the board screen; and
based on sensing at least one of the door opening or closing, provide the visual feedback to the one or more objects.

11. A control method of a home appliance, the control method comprising:
displaying one or more objects on a display provided in a door of the home appliance; and
based on sensing, by a sensor provided in the home appliance, at least one of an opening or a closing of the door of the home appliance, providing a visual feedback to the one or more objects on the display provided in the door of the home appliance,
wherein the providing of the visual feedback comprises, based on the one or more objects being an object that includes information related to a schedule, providing a different visual feedback based on a difference between a target date identified by the information related to schedule and current time information.

12. The control method according to claim 11, wherein the providing of the visual feedback comprises identifying whether to provide the visual feedback based on a type of the one or more objects.

13. The control method according to claim 11,
wherein the providing of the visual feedback comprises:
based on the one or more objects being a first type, providing a first visual feedback of a first form, and
based on the one or more objects being a second type, providing a second visual feedback of a second form, and
wherein the first visual feedback and the second visual feedback differ in at least one of a type of feedback effect, a strength of feedback effect or a reference axis of feedback effect.

14. The control method according to claim 11,
wherein the visual feedback comprises a swaying effect, and
wherein the providing the visual feedback comprises:
providing a pin object that provides a content object comprising at least one of an image or a memo and a function fixing the content object to a specific position of a display area of the display, and
providing the swaying effect to the content object with the position of the pin object as a reference axis.

15. The control method according to claim 11, wherein the visual feedback comprises at least one of a left and right swaying effect, a back and forth swaying effect, or a shaking effect.

16. The control method according to claim 15, wherein the providing of the visual feedback comprises identifying a swaying strength according to the swaying effect or a shaking strength according to the shaking effect based on an intensity of the opening or the closing of the door detected by the sensor.

17. The control method according to claim 15, wherein the providing of the visual feedback comprises:

identifying an intensity of the door opening or closing based on a sound detected by a microphone provided in the home appliance; and identifying a swaying strength according to the swaying effect or a shaking strength according to the shaking effect based on the intensity of the door opening or closing.

18. The control method according to claim 11, wherein the providing of the visual feedback comprises, based on identifying that current time has elapsed the target date, providing a visual feedback that drops the object to a lower area on a display area of the display.

* * * * *